United States Patent
Bell

(10) Patent No.: US 11,268,412 B2
(45) Date of Patent: Mar. 8, 2022

(54) CAMSHAFT PHASER

(71) Applicant: Schaeffler Techologies AG & Co. KG, Herzogenaurach (DE)

(72) Inventor: Shannon Bell, Sterling Heights, MI (US)

(73) Assignee: Schaeffler Techologies AG & Co. KG, Herzogenaurach (DE)

( * ) Notice: Subject to any disclaimer, the term of this patent is extended or adjusted under 35 U.S.C. 154(b) by 3 days.

(21) Appl. No.: 16/434,455

(22) Filed: Jun. 7, 2019

(65) Prior Publication Data

US 2020/0386126 A1 Dec. 10, 2020

(51) Int. Cl.
*F01L 7/18* (2006.01)
*F16D 41/06* (2006.01)
*F01L 1/344* (2006.01)
*F16D 41/064* (2006.01)

(52) U.S. Cl.
CPC ............... *F01L 7/18* (2013.01); *F01L 1/3442* (2013.01); *F16D 41/06* (2013.01); *F01L 2001/3445* (2013.01); *F16D 2041/0646* (2013.01)

(58) Field of Classification Search
CPC ... F01L 7/18; F01L 1/3442; F01L 2001/3445; F01L 2009/028; F01L 13/0036; F01L 13/0042; F01L 2013/0078; F16D 2041/0646

See application file for complete search history.

(56) References Cited

U.S. PATENT DOCUMENTS

| | | | |
|---|---|---|---|
| 8,056,519 B2 * | 11/2011 | Cuatt | F01L 1/3442 123/90.17 |
| 8,931,446 B2 | 1/2015 | Wagner et al. | |
| 10,167,747 B2 | 1/2019 | De Oliveira Ghiraldi et al. | |
| 2011/0162601 A1 * | 7/2011 | Fujiyoshi | F01L 1/3442 123/90.15 |
| 2012/0291735 A1 * | 11/2012 | Wagner | F01L 1/3442 123/90.17 |
| 2015/0300211 A1 * | 10/2015 | Bayrakdar | F01L 1/3442 123/90.17 |
| 2017/0350283 A1 * | 12/2017 | David | F01L 1/3442 |
| 2018/0058274 A1 * | 3/2018 | Lichti | F01L 1/3442 |
| 2018/0119581 A1 * | 5/2018 | De Oliveira Ghiraldi | F01L 1/3442 |

* cited by examiner

*Primary Examiner* — Hai H Huynh
*Assistant Examiner* — Diem T Tran

(57) ABSTRACT

A cam phaser mechanism includes an inner ring (rotor), and outer ring (stator), and a face plate. The inner ring that is wider than outer ring. The face plate is contoured such that it is thinner in a region in contact with the inner ring and thicker in a region in contact with the outer ring, thus compensating for the different widths of the inner ring and outer ring. The stator is fastened to the face plate by a plurality of bolts which are threaded into the face plate. The greater width of the face plate in this region provides sufficient thread engagement without increasing the overall width of the cam phaser mechanism.

18 Claims, 2 Drawing Sheets

CAMSHAFT PHASER

TECHNICAL FIELD

The disclosure concerns a cover for a camshaft phaser. More particularly, the disclosure concerns a cover with variable thickness designed to minimize an axial length of the camshaft phaser assembly.

BACKGROUND

FIG. 1 schematically illustrates a portion of a piston engine valve system. Crankshaft 10 rotates in response to combustion of fuel in cylinders. First sprocket 12 is fixed to the crankshaft 10. Second sprocket 14 is driven by the first sprocket 12 via chain 16. The relative sizes of sprockets 12 and 14 cause sprocket 14 to rotate once for every two revolutions of sprocket 12. Camshaft 18 is driven by sprocket 14 such that it rotates once for every two rotations of crankshaft 10. Cams on camshaft 18 actuate valves that permit flow of air/fuel mixture into cylinders and permit flow of combustion products out of cylinders at appropriate times during the power cycle.

In some engines, camshaft 18 is fixedly coupled to sprocket 18. In such systems, the valves open and close at the same crankshaft position regardless of operating condition. The engine designer must select valve opening and closing positions that provide acceptable performance in all operating conditions. This often requires a compromise between positions optimized for engine starting and for high speed operation.

To improve performance across variable operating conditions, some engines utilize a variable cam timing mechanism 20 that allows a controller to vary a rotational offset between sprocket 14 and camshaft 18.

SUMMARY

A variable cam timing mechanism includes a stator, a rotor, and a face plate. The stator has a toothed outer surface and a set of dividers extending radially inward from an inner surface. The rotor has a set of vanes extending radially outwardly from a cylindrical surface and located circumferentially between the dividers. The face plate is fastened to the stator by a set of bolts. The face plate has a first thickness in a first region in contact with the stator and a second thickness less than the first thickness in a second region in contact with the rotor. The face plate may define a set of threaded holes in the first region and the bolts may engage the threaded holes. The stator may have a third thickness and the rotor may have a fourth thickness greater than the third thickness. A sum of the first thickness and the third thickness may be equal to a sum of the second thickness and the fourth thickness. The face plate may define a recess and a pin may extend axially from one of the vanes to engage the recess to prevent relative rotation between the rotor and the stator. A camshaft may be fixedly coupled to the rotor. A crankshaft may be driveably connected to the stator such that a rotational speed of the stator is constrained to be one half of a rotational speed of the crankshaft.

A variable cam timing mechanism includes an outer ring, an inner ring, and a face plate. The outer ring has a toothed outer surface and a set of dividers extending radially inward from an inner surface. The outer ring has an outer ring thickness. The inner ring has a set of vanes extending radially outwardly from a cylindrical surface and located circumferentially between the dividers. The inner ring has an inner ring thickness greater than the outer ring thickness. The face plate is fastened to the outer ring by a set of bolts extending through the dividers and threaded into holes in the face plate. The face plate may have a first thickness in a first region in contact with the outer ring and a second thickness less than the first thickness in a second region in contact with the inner ring. A sum of the first thickness and the outer ring thickness may be equal to a sum of the second thickness and the inner ring thickness. The face plate may define a recess and a pin may extend axially from one of the vanes to engage the recess to prevent relative rotation between the inner ring and the outer ring. A camshaft may be fixedly coupled to the inner ring. A crankshaft may be driveably connected to the outer ring such that a rotational speed of the outer ring is constrained to be one half of a rotational speed of the crankshaft.

A method of assembling a cam timing mechanism includes positioning an inner ring inside an outer ring and inserting a plurality of bolts. The inner ring is positions inside the outer ring such that vanes of the inner ring are interspersed with dividers extending radially inward from the outer ring. The inner ring has an inner ring thickness. The outer ring has an outer ring thickness less than the inner ring thickness. The plurality of bolts are inserted through the dividers and threaded into a face plate. The inner ring may contact a first portion of the face plate having a first thickness. The outer ring may contact a second portion of the face plate having a second thickness greater than the first thickness.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
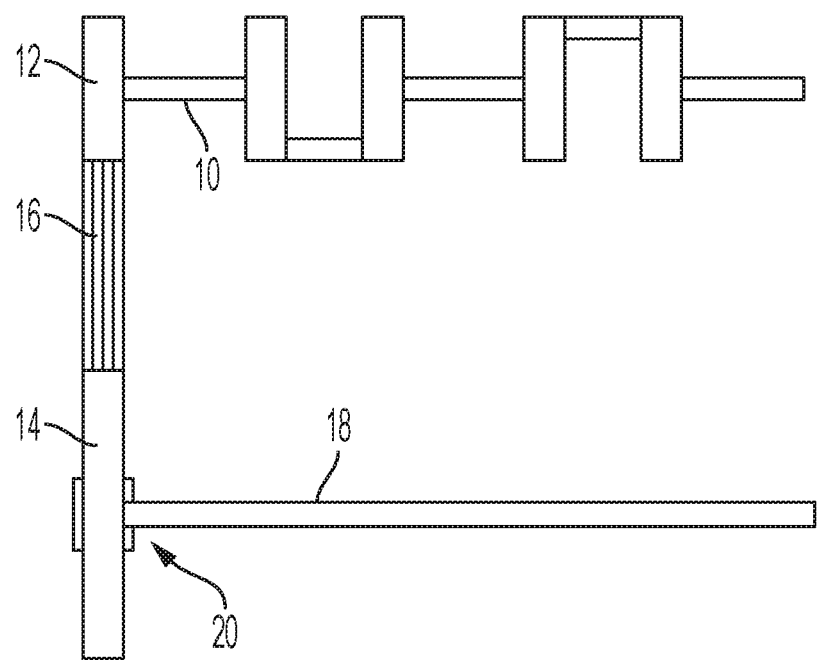
FIG. 1 is a schematic representation of an engine cam system to operate intake and exhaust valves.
Figure 2:
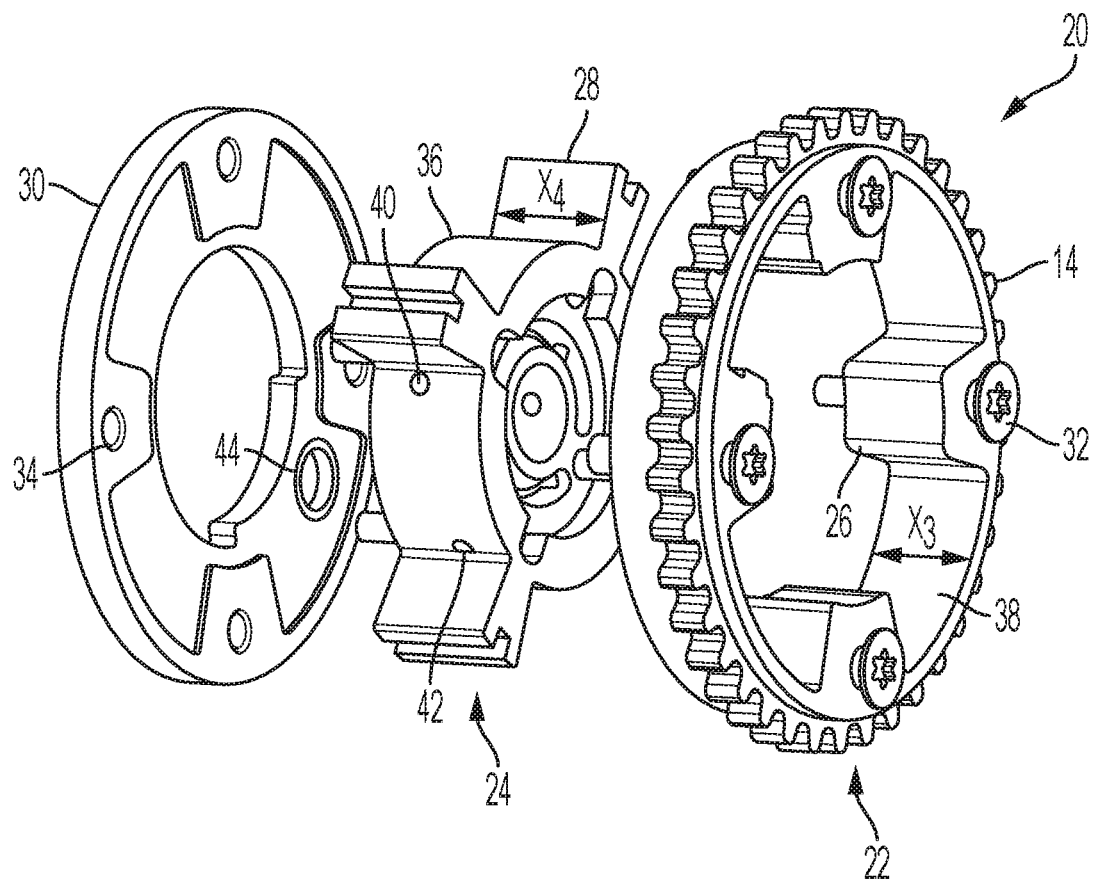
FIG. 2 is an exploded pictorial view of a cam phaser mechanism suitable for use in the engine cam system of FIG. 1.

FIG. 2 illustrates part of a variable cam timing mechanism 20. Sprocket 14 is fixed to or integrally formed with outer ring 22. Outer ring 22 may sometimes be referred to as a stator. Camshaft 18 is fixedly coupled to inner ring 24. Inner ring 24 may sometimes be referred to as a rotor. A number of dividers 26 (four in FIG. 2) extend radially inward from outer ring 22. A number of vanes 28 extend radially outward from inner ring 24. The vanes 28 are interspersed with the dividers 26 such that inner ring 24 can rotate through a limited range with respect to outer ring 22. Face plates are attached on the axial ends of outer ring 22. For clarity, only one of the face plates, 30, is shown in FIG. 2. A set of bolts 32 hold the assembly together. Each bolt extends through the face plate that is not shown, through a hole in one of the dividers, and engages a threaded hole 34 in the second face plate 30.

Each vane 28 circumferentially separates the space between adjacent dividers 26 into two volumes. Each volume is defined circumferentially by a divider and a vane, defined radially by an outer surface 36 of the inner ring 24 and an inner surface 38 of outer ring 22, and defined axially by the two face plates. Fluid is provided via camshaft 18 and passageway 40 into one of these volumes. Fluid is provided via camshaft 18 and passageway 42 into the other of the two volumes. Fluid pressure in one of the two volumes urges inner ring 24 to rotate clockwise with respect to outer ring 22 while pressure in the other volume urges inner ring 24 to rotate counter-clockwise with respect to outer ring 22. A controller adjusts the relative rotational position of inner ring 24 with respect to outer ring 22 by adjusting the pressures of these two fluid streams. When the pressures are maintained equal, inner ring 24 and outer ring 22 rotate in unison in response to the action of chain 16.

When both fluid streams are de-pressurized, a pin extends axially from inner ring 24 and engages recess 44 in face plate 30. This maintains the relative rotational position in a predetermined position while the engine is not running and therefore not generating fluid pressure. When the engine re-starts, fluid pressure causes the pin to retract and disengage from recess 44 such that the relative rotational position may be adjusted.

Figure 3:
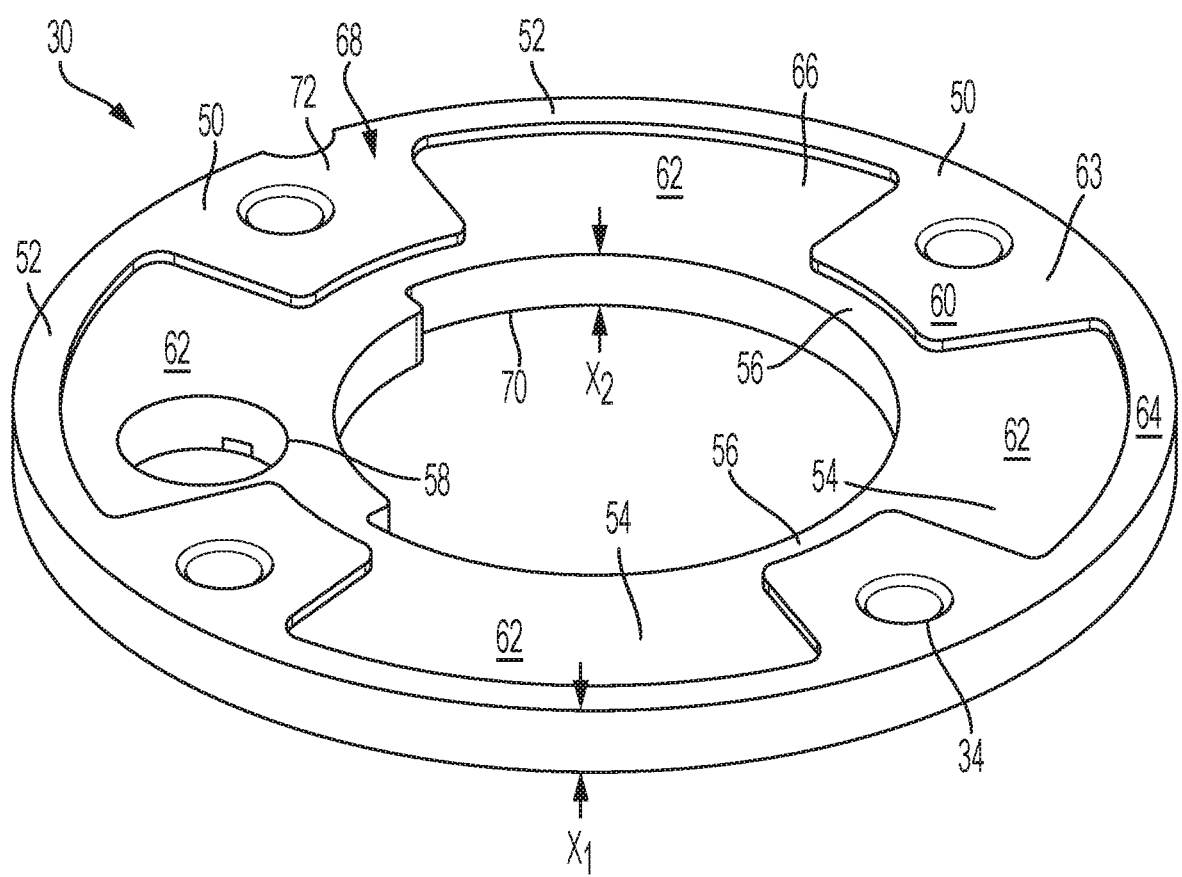
FIG. 3 is a pictorial view of a locking cover suitable for use in the cam phaser mechanism of FIG. 2.

FIG. 3 illustrates face plate 30 in more detail. The portions 50 adjacent to holes 34, as well as outer perimeter portions 52, have a first thickness $x_1$. This thickness is determined based on the required thread engagement of bolt 32. The portions 54 circumferentially between portions 50, as well as inner perimeter portions 56, have a second thickness $x_2$. Second thickness $x_2$ need only be sufficient to provide stiffness against the fluid pressure. Therefore, $x_2<x_1$. A hole 58 is formed in one of the portions 54. An insert is placed in hole 58 to form recess 44. The face plate 30 includes a first axial side 68 and a second axial side 70. The first axial side 68 includes a first surface 60 that corresponds to the portions 50 adjacent to the holes 34, a second surface 62 that corresponds to the portions 54, and a third outer perimeter surface 64 that corresponds to the outer perimeter portions 52. The first surface 60 and the third outer perimeter surface 64 can be coplanar. Furthermore, the first surface 60 and the third outer perimeter surface 64 can be adjoined into one continuous surface 63 that encompasses the portions 50 and the outer perimeter portions 52. As also shown in FIG. 3, the portions 50 and the outer perimeter portions 52 can be adjoined into one continuous portion 72. The second surface 62 can be axially offset from the first surface 60 in a direction away from the outer ring 22 such that a depression 66 is formed on the first axial side 68. Thus, the depression 66 and the second surface 62 thereof, axially define a portion of the previously described volumes formed by a divider and vane that receive fluid pressure to move the inner ring 24 with respect to the outer ring 22.

Returning to FIG. 2, note that outer ring 22 has a thickness $x_3$ and inner ring 24 has a thickness $x_4$ which is greater than $x_3$. Specifically, $x_1+x_3=x_2+x_4$. Thickness $x_4$ is selected to provide an appropriate relationship between fluid flow rate and rate of change of relative position. If face plate 30 were flat, the thickness of the assembly would be the sum of $x_1$, $x_4$, and the thickness of the other face plate. With the design illustrated in FIGS. 2 and 3, the thickness of the assembly is reduced to the sum of $x_2$, $x_4$, and the thickness of the other face plate. This reduction is accomplished without any reduction of durability or compromise of function.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A variable cam timing mechanism comprising:
  a stator having a toothed outer surface and a set of dividers extending radially inward from an inner surface;
  a rotor having a set of vanes extending radially outwardly from a cylindrical surface and located circumferentially between the dividers; and
  a face plate fastened to the stator by a set of bolts, the face plate having:
    a set of holes configured to receive the bolts;
    a first region adjacent to the set of holes, the first region having a first thickness and a first surface in contact with the stator;
    a second region having a second thickness less than the first thickness, the second region having a second surface configured to receive fluid pressure to move the rotor; and
    a third outer perimeter region, at least a portion of the third outer perimeter region adjoined with at least a portion of the first region, the third outer perimeter region having:
      a thickness equal to the first thickness; and
      a third outer perimeter surface in contact with the stator.

2. The variable cam timing mechanism of claim 1, wherein the stator has a third thickness and the rotor has a fourth thickness greater than the third thickness.

3. The variable cam timing mechanism of claim 2, wherein a sum of the first thickness and the third thickness is equal to a sum of the second thickness and the fourth thickness.

4. The variable cam timing mechanism of claim 1, wherein the face plate defines a recess and a pin extends axially from one of the vanes to engage the recess to prevent relative rotation between the rotor and the stator.

5. The variable cam timing mechanism of claim 1, further comprising a camshaft fixedly coupled to the rotor.

6. The variable cam timing mechanism of claim 5, further comprising a crankshaft driveably connected to the stator such that a rotational speed of the stator is constrained to be one half of a rotational speed of the crankshaft.

7. The variable cam timing mechanism of claim 1, wherein the first surface and the third outer perimeter surface are coplanar and adjoined into one continuous surface.

8. The variable cam timing mechanism of claim 1, wherein the face plate further comprises a first axial side, the first axial side including the first surface, the second surface, and the third outer perimeter surface.

9. The variable cam timing mechanism of claim 8, wherein the second surface is axially offset from the first surface to form a depression on the first axial side of the face plate, the depression configured to receive the rotor.

10. The variable cam timing mechanism of claim 8, wherein the second surface is offset from the first surface in a direction away from the stator.

11. A variable cam timing mechanism comprising:
   an outer ring having a toothed outer surface and a set of dividers extending radially inward from an inner surface, the outer ring having an outer ring thickness;
   an inner ring having a set of vanes extending radially outwardly from a cylindrical surface and located circumferentially between the dividers, the inner ring having an inner ring thickness greater than the outer ring thickness; and
   a face plate fastened to the outer ring by a set of bolts extending through the dividers and threaded into holes in the face plate, the face plate having:
      a first surface in contact with the outer ring, the first surface adjacent to at least one of the holes;
      a second surface axially offset from the first surface in a direction away from the outer ring, the second surface configured to receive fluid pressure to move the inner ring; and,
      a third outer perimeter surface in contact with the outer ring, and at least a portion of the first surface is adjoined with the third outer perimeter surface.

12. The variable cam timing mechanism of claim 11, wherein the face plate has:
   a first thickness in a first region, the first region including the third outer perimeter surface and the first surface; and
   a second thickness less than the first thickness in a second region, and the second region forming a depression with the first region, the depression extending away from the outer ring and configured to receive fluid pressure to move the inner ring.

13. The variable cam timing mechanism of claim 12, wherein a sum of the first thickness and the outer ring thickness is equal to a sum of the second thickness and the inner ring thickness.

14. The variable cam timing mechanism of claim 11, wherein the face plate defines a recess and a pin extends axially from one of the vanes to engage the recess to prevent relative rotation between the inner ring and the outer ring.

15. The variable cam timing mechanism of claim 11, further comprising a camshaft fixedly coupled to the inner ring.

16. The variable cam timing mechanism of claim 15, further comprising a crankshaft driveably connected to the outer ring such that a rotational speed of the outer ring is constrained to be one half of a rotational speed of the crankshaft.

17. A method of assembling a cam timing mechanism comprising; positioning an inner ring inside an outer ring such that vanes of the inner ring are interspersed with dividers extending radially inward from the outer ring, the inner ring having an inner ring thickness and the outer ring having an outer ring thickness less than the inner ring thickness; and inserting a plurality of bolts through the dividers and threading them into a plurality of holes arranged in a face plate, the face plate having:
   a first surface in contact with the outer ring and adjacent to the plurality of holes;
   a second surface axially offset from the first surface in a direction away from the outer ring, the second surface configured to receive fluid pressure to move the inner ring; and,
   a third outer perimeter surface in contact with the outer ring, and at least a portion of the first surface is adjoined with the third outer perimeter surface.

18. The method of claim 17, wherein the inner ring and a first portion of the face plate having a second thickness form at least a portion of a volume configured for receiving fluid pressure to move the inner ring, and the outer ring contacts a second portion of the face plate having a first thickness greater than the second thickness, the second portion including the third outer perimeter surface and the first surface.

* * * * *